US011002553B2

(12) United States Patent
Svensson et al.

(10) Patent No.: US 11,002,553 B2
(45) Date of Patent: May 11, 2021

(54) METHOD AND DEVICE FOR EXECUTING AT LEAST ONE MEASURE FOR INCREASING THE SAFETY OF A VEHICLE

(71) Applicant: Robert Bosch GmbH, Stuttgart (DE)

(72) Inventors: Anke Svensson, Braunschweig (DE); Aysylu Gabdulkhakova, Hildesheim (DE); Michael Goerlich, Meinhard-Grebendorf (DE); Peter Christian Abeling, Hannover (DE); Stefan Werder, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 16/407,748

(22) Filed: May 9, 2019

(65) Prior Publication Data
US 2019/0360820 A1    Nov. 28, 2019

(30) Foreign Application Priority Data
May 24, 2018  (DE) .......................... 102018208182.4

(51) Int. Cl.
*G01C 21/32* (2006.01)
*G01S 13/89* (2006.01)
*G01S 17/89* (2020.01)
*B60W 40/02* (2006.01)
*G01C 21/26* (2006.01)
(Continued)

(52) U.S. Cl.
CPC ............. *G01C 21/32* (2013.01); *B60W 40/02* (2013.01); *G01C 7/04* (2013.01); *G01C 21/26* (2013.01); *G01S 13/89* (2013.01); *G01S 17/89* (2013.01)

(58) Field of Classification Search
CPC .......... G01C 21/32; G01C 21/26; G01C 7/04; G01S 13/89; G01S 17/89; B60W 40/02
See application file for complete search history.

(56) References Cited

U.S. PATENT DOCUMENTS

| 2011/0137527 | A1* | 6/2011 | Simon | B60W 30/16 |
| | | | | 701/45 |
| 2011/0210866 | A1* | 9/2011 | David | G08G 1/166 |
| | | | | 340/903 |
| 2017/0254651 | A1 | 9/2017 | Resende | |

(Continued)

FOREIGN PATENT DOCUMENTS

| DE | 102014015073 A1 | 4/2016 |
| DE | 102014223363 A1 | 5/2016 |
| DE | 102017102315 A1 | 8/2018 |

*Primary Examiner* — Quoc A Tran
(74) *Attorney, Agent, or Firm* — Norton Rose Fulbright US LLP; Gerard Messina

(57) ABSTRACT

A method and device for generating a highly precise map, including a step of receiving surrounding-area data values, which represent a surrounding area of a vehicle, the surrounding area encompassing at least one static surrounding-area feature and at least one mobile surrounding-area feature; including a step of receiving movement data values, which represent a movement of the at least one mobile surrounding-area feature in the surrounding area of the vehicle; including a step of generating a highly precise map on the basis of the surrounding-area data values, using the at least one static surrounding-area feature, and excluding the at least one mobile surrounding-area feature, the exclusion occurring as a function of the movement; and including a step of providing the highly precise map.

7 Claims, 3 Drawing Sheets

(51) Int. Cl.
*G01C 7/04* (2006.01)
*G06F 17/00* (2019.01)

(56) References Cited

U.S. PATENT DOCUMENTS

2017/0261995 A1* 9/2017 Heimberger ......... G05D 1/0088
2019/0101398 A1* 4/2019 Mielenz ................ G01C 21/32

* cited by examiner

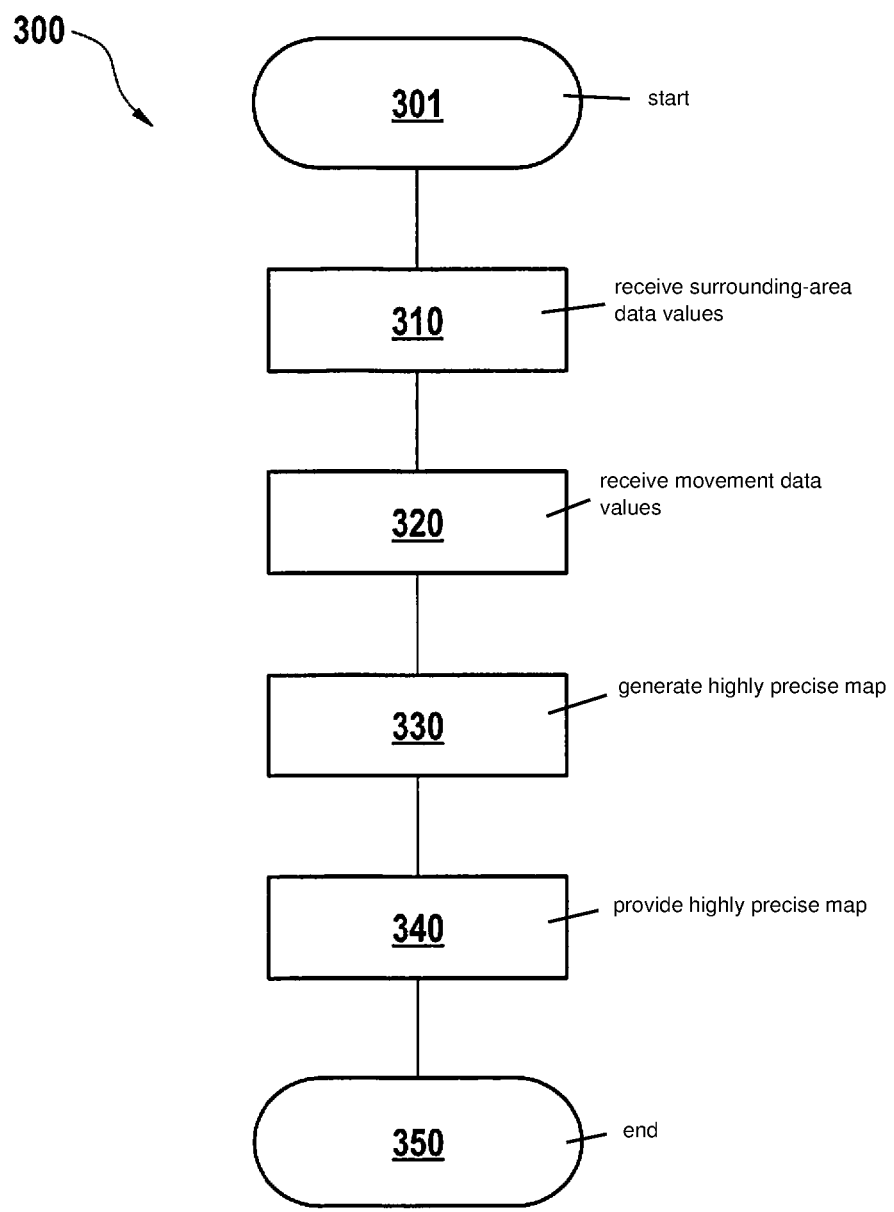

METHOD AND DEVICE FOR EXECUTING AT LEAST ONE MEASURE FOR INCREASING THE SAFETY OF A VEHICLE

CROSS REFERENCE

The present application claims the benefit under 35 U.S.C. § 119 of German Patent Application No. DE 102018208182.4 filed on May 24, 2018, which is expressly incorporated herein by reference in its entirety.

SUMMARY

The present invention relates to a method and device for generating a highly precise map, including a step of receiving surrounding-area data values, which represent a surrounding area of a vehicle, the surrounding area including at least one static surrounding-area feature and at least one mobile surrounding-area feature; a step of receiving movement data values, which represent a movement of the at least one mobile surrounding-area feature; a step of generating a highly precise map on the basis of the surrounding-area data values, using the at least one static surrounding-area feature, and excluding the at least one mobile surrounding-area feature, the exclusion occurring as a function of the movement; and a step of providing the highly precise map.

The method of the present invention for generating a highly precise map includes a step of receiving surrounding-area data values, which represent a surrounding area of a vehicle, the surrounding area containing at least one static surrounding-area feature and at least one mobile surrounding-area feature; and a step of receiving movement data values, which represent a movement of the at least one mobile surrounding-area feature in the surrounding area of the vehicle. The method further includes a step of generating a highly precise map on the basis of the surrounding-area data values, using the at least one static surrounding-area feature, and excluding the at least one mobile surrounding-area feature, the exclusion occurring as a function of the movement; and a step of providing the highly precise map.

A highly precise map is to be understood as a digital map, which is present in the form of (map) data values in a storage medium. The highly precise map is formed, for example, in such a manner, that one or more map layers are included; a map layer showing, for example, a map from the bird's-eye perspective (course and position of roads, buildings, landscape features, etc.). This corresponds, for example, to a map of a navigation system. A further map layer may include a radar map; the surrounding area features, which are contained by the radar map, being stored with a radar signature. A further map layer includes, for example, a lidar map; the surrounding area features, which are contained by the radar map, being stored with a lidar signature.

The highly precise map is formed, in particular, in such a manner, that it is suited for the navigation of a vehicle, in particular, of an automated vehicle. To that end, the individual map layers contain, for example, surrounding area features having a GPS position, this position being known with a high degree of accuracy. In this context, the surrounding-area features represent the surrounding area (of the mobile device and/or of the automated vehicle), for example, in the form of buildings and/or landscape features (lakes, rivers, mountains, forests, etc.) and/or traffic infrastructure features and/or further features.

A highly precise position is to be understood as a position, which is so accurate within a predefined coordinate system, for example, GNSS coordinates, that this position does not exceed a maximum allowable degree of unsharpness. In this context, the maximum lack of sharpness may be a function of the surrounding area, for example, the number and/or arrangement of the surrounding-area features. In addition, the maximum degree of unsharpness may be a function of whether an, in particular, automated vehicle is operated in a partially, highly or fully automated manner. In principle, the maximum degree of unsharpness is so low, that, in particular, reliable operation of an automated vehicle is ensured. For fully automated operation of an automated vehicle, the maximum degree of unsharpness is, for example, on the order of approximately 10 centimeters.

The at least one static surrounding-area feature is to be understood, for example, as a structure (building, bridge, tunnel, etc.) and/or an infrastructure feature (guard rail, road marking, traffic sign, etc.) and/or a landscape feature (plant, stretch of water, mountain, field, etc.). The at least one mobile surrounding-area feature is to be understood, for example, as a moving vehicle (motor vehicle, train, bicycle, etc.) and/or a pedestrian and/or an animal and/or further moving objects.

With the aid of the device of the present invention, the method of the present invention may achieve an object of improving and/or adapting and/or updating a map, in particular, a highly precise map. The advantages of the method become further apparent in the improved quality of the highly precise map, as well as in the improvement of the localization based on this highly precise map, in particular, in the case of locating an (automated) vehicle. In addition, the generation of a highly precise map may be accelerated, and consequently, the provision time of such a highly precise map may be reduced. Furthermore, the amount of memory taken up by the highly precise map may be reduced, which constitutes, in turn, a technical advantage in the transmission and/or the storage of the map data.

The surrounding-area data values are preferably acquired with the aid of a surround sensor system of the vehicle, and the movement data values are preferably acquired by a sensor system independent of the surround sensor system of the vehicle.

The surround sensor system and/or sensor system is to be understood as at least one video and/or radar and/or lidar and/or ultrasonic and/or at least one further sensor, which is designed to monitor the surrounding area in the form of surrounding-area data values and/or movement data values.

An advantage of this is that the data values are acquired directly and used for generating the highly precise map in a highly up-to-date manner. This increases the quality and up-to-dateness of the map.

The sensor system is preferably contained by an infrastructure device in the surrounding area.

An infrastructure device is to be understood, for example, as a traffic sign and/or a guard rail and/or a building close to (within a few meters of) a traffic route and/or a traffic monitoring unit, etc.

The highly precise map is preferably provided in such a manner, that an automated vehicle is operated as a function of the highly precise map. In one possible specific embodiment, the vehicle corresponds to the automated vehicle.

An automated vehicle is to be understood as a partially, highly or fully automated vehicle.

Operation of the automated vehicle is to be understood to mean that the automated vehicle is operated in a partially, highly or fully automated manner. In this context, operation includes, for example, determining a trajectory for the automated vehicle and/or following the trajectory, using automatic transverse and/or longitudinal control and/or executing safety-related driving functions, etc.

An advantage of this is that the safety during operation of an automated vehicle is increased.

The highly precise map is preferably generated in such a manner, that the highly precise map includes an evaluation of the surrounding area as a function of the at least one static surrounding-area feature, and as a function of the at least one mobile surrounding-area feature; the evaluation representing a measure of how reliably the automated vehicle may be operated as a function of the highly precise map.

In this connection, reliably is understood to mean the time interval over which, and/or the distance over which, and/or the environment (city, country, expressway, etc.) in which, and/or the level of safety at which the automated vehicle is operated in an automated manner.

An advantage of this is that the quality and/or the potential uses of the highly precise map are further increased, through which the very operation of an automated vehicle may be conducted more safely and comprehensively.

The device of the present invention for generating a highly precise map includes first devices for receiving surrounding-area data values, which represent a surrounding area of a vehicle, the surrounding area containing at least one static surrounding-area feature and at least one mobile surrounding-area feature; and second devices for receiving movement data values, which represent a movement of the at least one mobile surrounding-area feature in the surrounding area of the vehicle. The device further includes third devices for generating a highly precise map on the basis of the surrounding-area data values, using the at least one static surrounding-area feature, and excluding the at least one mobile surrounding-area feature, the exclusion occurring as a function of the movement; and fourth devices for providing the highly precise map.

The first devices and/or the second devices and/or the third devices and/or the fourth devices are preferably configured to execute the method according to the present invention.

Advantageous further refinements of the present invention are described herein.

BRIEF DESCRIPTION OF THE DRAWINGS

Exemplary embodiments of the present invention are represented in the figures and are explained in more detail in the description below.

FIG. 3 shows purely illustratively, an exemplary embodiment of the method of the present invention, in the form of a flow chart.

DETAILED DESCRIPTION OF EXAMPLE EMBODIMENT

Figure 1:
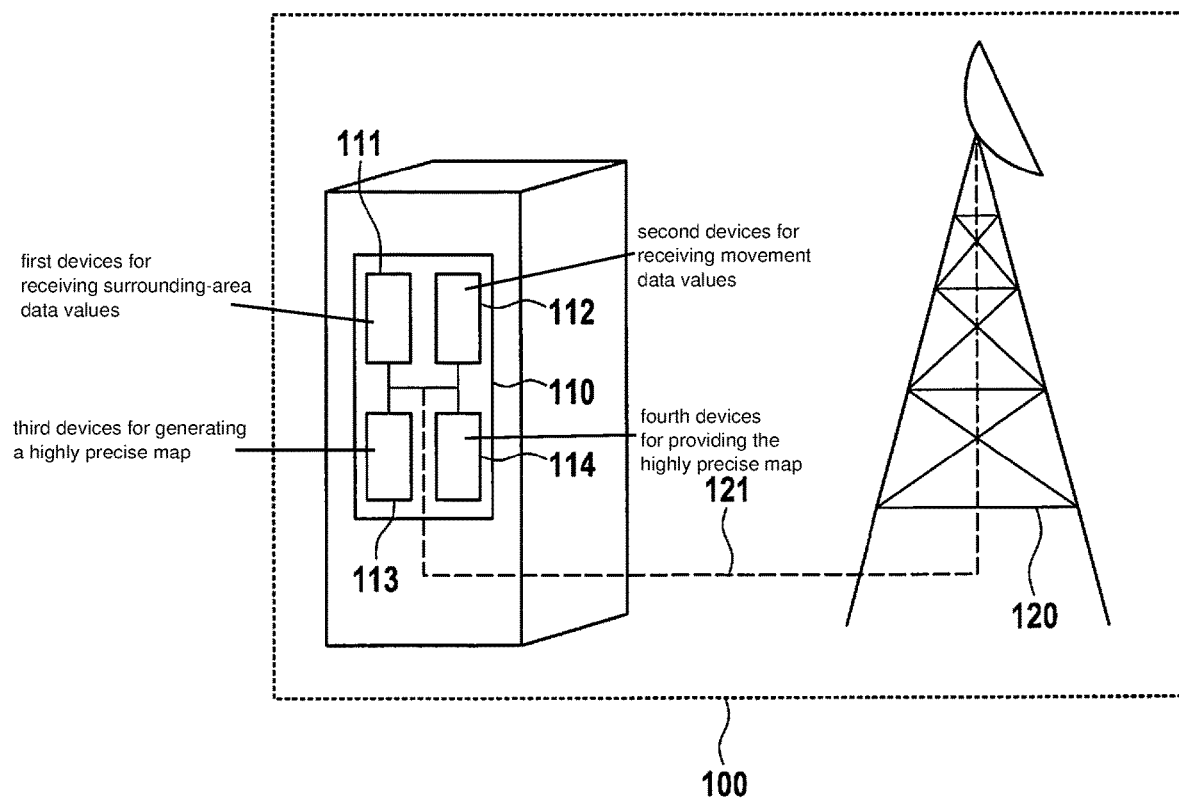
FIG. 1 shows an exemplary embodiment of the device according to the present invention.

FIG. 1 shows an illustratively depicted processing unit 100, which includes a device 110 for generating 330 a highly precise map. A processing unit 100 is to be understood as a server, for example. In one further specific embodiment, a processing unit 100 is to be understood as a cloud, that is, a group of at least two electric data processing units, which exchange data, for example, via the Internet. In one further specific embodiment, processing unit 100 corresponds to device 110.

Device 110 includes first devices 111 for receiving 310 surrounding-area data values, which represent a surrounding area 210 of a vehicle 200, the surrounding area 210 containing at least one static surrounding-area feature 211 and at least one mobile surrounding-area feature 212. Device 110 further includes second devices 112 for receiving 320 movement data values, which represent a movement of the at least one mobile surrounding-area feature 212 in surrounding area 210 of vehicle 200; as well as third devices 113 for generating 330 a highly precise map on the basis of the surrounding-area data values, using the at least one static surrounding-area feature 211, and excluding the at least one mobile surrounding-area feature 212, the exclusion occurring as a function of the movement. In addition, device 110 includes fourth devices 114 for providing 340 the highly precise map.

Depending on the specific embodiment of processing unit 100 in question, different variants of first devices 111 and/or second devices 112 and/or third devices 113 and/or fourth devices 114 may be formed. If processing unit 100 takes the form of a server, first devices 111 and/or second devices 112 and/or third devices 113 and/or fourth devices 114 are located at the same place in relation to the location of device 110.

If processing unit 100 takes the form of a cloud, then first devices 111 and/or second devices 112 and/or third devices 113 and/or fourth devices 114 may be located in different places, for example, in different cities and/or in different countries; a connection, such as the Internet, being configured for exchange of (electronic) data between first devices 111 and/or second devices 112 and/or third devices 113 and/or fourth devices 114.

First devices 111 are configured to receive surrounding-area data values, which represent a surrounding area 210 of a vehicle 200. In this context, first devices 111 include a receiving and/or transmitting unit, with the aid of which data are requested and/or received. In a further specific embodiment, first devices 111 are configured in such a manner, that, starting from device 110, they are connected to an externally situated transmitting and/or receiving unit 122 via a wired and/or wireless connection 121. First devices 111 further include electronic data processing elements, for example, a processor, working memory, and a hard disk drive, which are configured to store and/or process the surrounding-area data values, for example, to make changes and/or adjustments to the data format, and subsequently to transmit them to third devices 113. In one further specific embodiment, first devices 111 are configured to transmit the received surrounding-area data values, without data processing elements, to third devices 113.

The device further includes second devices 112, which are configured to receive 320 movement data values, which represent a movement of the at least one mobile surrounding-area feature 212 in surrounding area 210 of vehicle 200. In this context, second devices 111 include a receiving and/or transmitting unit, with the aid of which data are requested and/or received. In one further specific embodiment, second devices 111 are configured in such a manner, that, starting from device 110, they are connected to an externally situated transmitting and/or receiving unit 122 via a wired and/or wireless connection 121. Second devices 111 further include electronic data processing elements, for example, a processor, working memory, and a hard disk drive, which are configured to store and/or process the surrounding-area data values, for example, to make changes and/or adjustments to the data format, and subsequently to transmit them to third devices 113. In one further specific embodiment, second devices 111 are configured to transmit the received surrounding-area data values, without data processing elements, to third devices 113. In one specific embodiment, second devices 112 correspond to first devices 111.

Device 110 further includes third devices 113 for generating 330 a highly precise map on the basis of the surrounding-area data values, using the at least one static surrounding-area feature 211, and excluding the at least one mobile surrounding-area feature 212, the exclusion occurring as a function of the movement. To that end, second server devices 212 take the form, for example, of a processing unit having electronic data processing elements (processor, working memory, hard disk drive, software).

In one specific embodiment, the highly precise map is generated while a first map is recognized as not complete and/or not up to date, since, for example, the at least one static surrounding-area feature is not contained by the map, and this first map is supplemented by addition of the at least one static surrounding-area feature to form the highly precise map.

In one further specific embodiment, the highly precise map is generated, for example, as map data values are requested by a map supplier, e.g., with the aid of first devices 111 and/or second devices 112, and are supplemented by the at least one static surrounding-area feature.

In one specific embodiment, so-called SLAM methods are used, for example, for generating the highly precise map. In this connection, e.g., positions of static surrounding-area features are combined to form so-called graphs. Subsequently, e.g., a plurality of graphs are linked to each other and optimized with the aid of a further step of the SLAM method. Subsequently, the highly precise map is generated, using, as a starting point, a previously existing map, which is supplemented by and/or adapted using these optimized graphs.

In addition, the device includes fourth devices 114 for providing 340 the highly precise map. Fourth devices 114 correspond to at least one specific embodiment of first devices 111 and/or second devices 112, and/or are identical to first devices 111 and/or second devices 112. In one specific embodiment, the highly precise map is provided, for example, in such a manner, that the highly precise map is transmitted to vehicle 200 and/or to an automated vehicle 230, and/or vehicle 100 and/or automated vehicle 230 is operated, in particular, in an automated manner, as a function of the highly precise map. In one further specific embodiment, the highly precise map is provided in such a manner, that the highly precise map includes an evaluation of surrounding area 210 as a function of the at least one static surrounding-area feature 211, and as a function of the at least one mobile surrounding-area feature 212; the evaluation representing a measure of how reliably the automated vehicle 230 may be operated as a function of the highly precise map.

Figure 2:
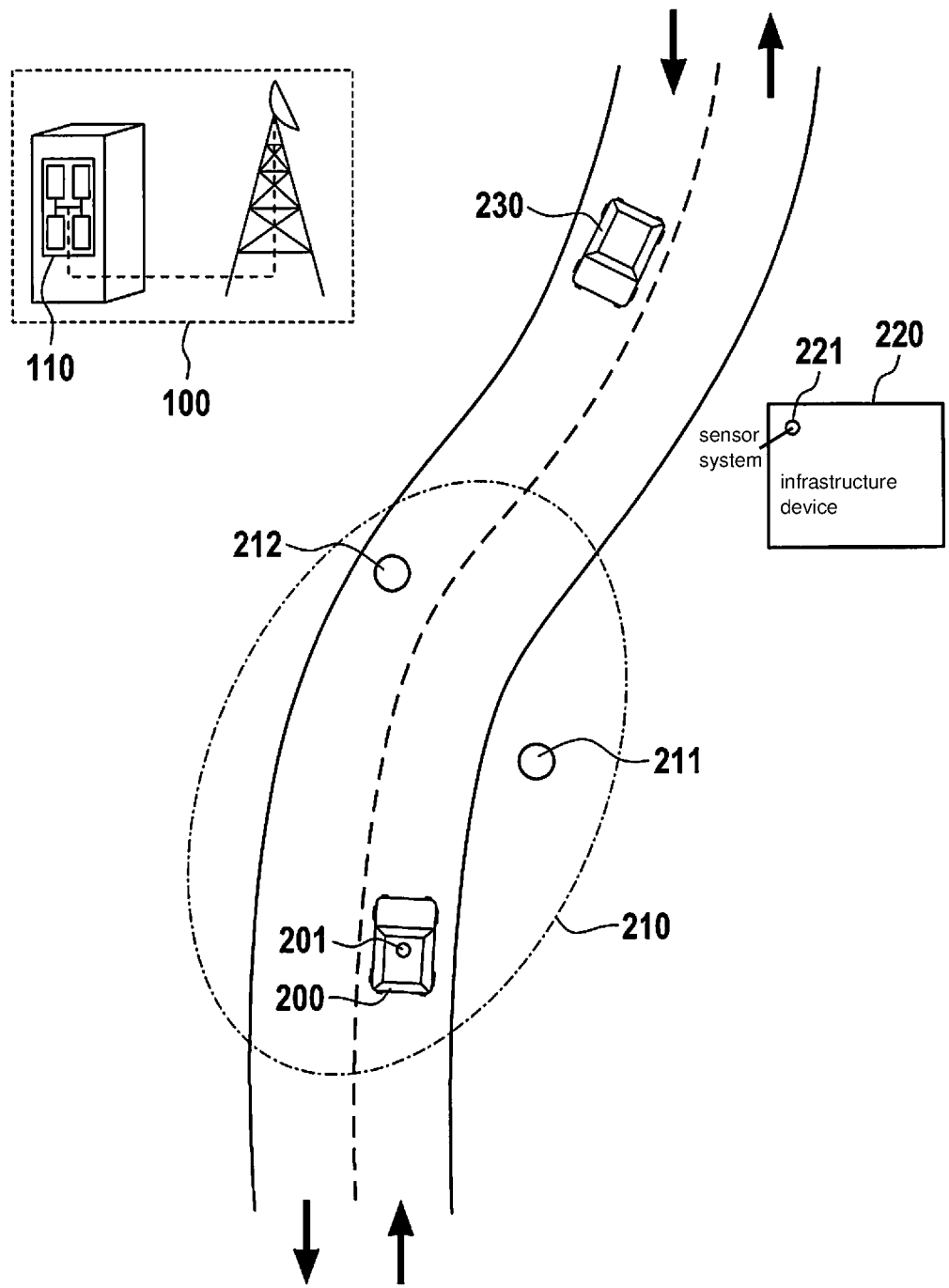
FIG. 2 shows an exemplary embodiment of the method of the present invention.

FIG. 2 shows an exemplary embodiment of method 300 of the present invention.

In this context, sensor data and/or surrounding-area data values are acquired by a (mapping) vehicle 200 and/or a mapping fleet and transmitted to the device 110, which receives the surrounding-area data values. In addition, external movement data or movement data values of other moving objects and/or of mobile surrounding-area features 212 are acquired and transmitted to device 110, which receives the movement data values. In this context, device 110 synchronizes the surrounding-area data values and the movement data values locally and/or temporally. Using this as a baseline, (potential) mobile surrounding-area features 212 are filtered out and therefore not contained by the highly precise map. In this context, the local and/or temporal synchronization of the surrounding-area data values and the movement data values is carried out, for example, in such a manner, that the last movement of a mobile surrounding-area feature 212 is derived from the movement data values, in order to consequently determine, which mobile surrounding-area feature 212 has been erroneously recognized or detected as a static surrounding-area feature 211 and therefore actually represents a (potential) mobile surrounding-area feature 212. This is necessary, since at the time of acquiring the surrounding-area data values, as a rule, it cannot be distinguished whether an object is a static surrounding-area feature 211 or a mobile surrounding-area future 212, since, for example, at the time of acquisition, the relative movement of the two surrounding-area features may be zero. This may occur, for example, at a red light, at which all of the vehicles or pedestrians are stationary, although they are potentially mobile. Starting out from the movement data values, which are acquired, in particular, by a sensor system 221, which is independent of surround sensor system 201 of vehicle 200 and is contained, for example, by an infrastructure device 220 in surrounding area 210, the path of motion of the at least one mobile surrounding-area feature 212 (in the mapping region) is now reproduced, for example, in order to deduce, from this, which object is potentially mobile. In this connection, the sequence of movements of the objects have to be accurately acquired temporally and/or locally, in order that it may be determined, which object has moved before and therefore constitutes a mobile surrounding-area feature 212, and which object represents a static surrounding-area feature 211. Thus, on one hand, the quality of the highly precise map is increased, and on the other hand, for example, the amount of memory taken up by the highly precise map is reduced, since mobile surrounding-area features 212 are not stored along with it.

In one specific embodiment, the highly precise map is provided, for example, in such a manner, that the highly precise map is transmitted to vehicle 200 and/or to an automated vehicle 230, and/or vehicle 100 and/or automated vehicle 230 is operated, in particular, in an automated manner, as a function of the highly precise map.

FIG. 3 shows an exemplary embodiment of a method 300 for generating 330 a highly precise map.

Method 300 starts in step 301.

In step 310, surrounding-area data values, which represent a surrounding area 210 of a vehicle 200, are received; surrounding area 210 encompassing at least one static surrounding-area feature 211 and at least one mobile surrounding-area feature 212.

In step 320, movement data values, which represent a movement of the at least one mobile surrounding-area feature 212 in the surrounding area 210 of vehicle 200, are received.

In step 330, a highly precise map is generated on the basis of the surrounding-area data values, using the at least one static surrounding-area feature 211, and excluding the at least one mobile surrounding-area feature 212; the exclusion occurring as a function of the movement.

In step 340, the highly precise map is provided.

In step 350, method 300 ends.

What is claimed is:

1. A method for generating a highly precise map, the method comprising:
receiving surrounding-area data values which represent a surrounding area of a vehicle, the surrounding area containing at least one static surrounding-area feature and at least one mobile surrounding-area feature;

receiving movement data values which represent a movement of the at least one mobile surrounding-area feature in the surrounding area of the vehicle;

generating a highly precise map based on the surrounding-area data values, using the at least one static surrounding-area feature, and excluding the at least one mobile surrounding-area feature, the exclusion occurring as a function of the movement; and providing the highly precise map;

wherein the at least one mobile surrounding-area feature is determined and filtered out by performing the following:

synchronizing the surrounding-area data values and the movement data values locally and/or temporally, so that a last movement of a potential mobile surrounding-area feature is derived from movement data values, to determine which mobile surrounding-area feature has been erroneously recognized or detected as a static surrounding-area feature and therefore actually represents the potential mobile surrounding-area feature.

2. The method as recited in claim 1, wherein the surrounding-area data values are acquired with the aid of a surround sensor system of the vehicle, and the movement data values are acquired by a sensor system independent of the surround sensor system of the vehicle.

3. The method as recited in claim 2, wherein the sensor system is contained by an infrastructure device in the surrounding area.

4. The method as recited in claim 1, wherein the highly precise map is provided so that an automated vehicle is operated as a function of the highly precise map.

5. The method as recited in claim 4, wherein the highly precise map is generated so that the highly precise map includes an evaluation of the surrounding area as a function of the at least one static surrounding-area feature, and as a function of the at least one mobile surrounding-area feature, and wherein the evaluation represents a measure of how the automated vehicle may be operated as a function of the highly precise map.

6. A device for generating a highly precise map, comprising:

a non-transitory machine-readable storage medium, on which is stored a computer program, which is executable by a processor, including:

a program code arrangement having program code for generating the highly precise map, by performing the following:

receiving surrounding-area data values which represent a surrounding area of a vehicle, the surrounding area containing at least one static surrounding-area feature and at least one mobile surrounding-area feature;

receiving movement data values, which represent a movement of the at least one mobile surrounding-area feature in the surrounding area of the vehicle;

generating the highly precise map based on the surrounding-area data values, using the at least one static surrounding-area feature, and excluding the at least one mobile surrounding-area feature, the exclusion occurring as a function of the movement; and providing the highly precise map;

wherein the at least one mobile surrounding-area feature is determined and filtered out by performing the following:

synchronizing the surrounding-area data values and the movement data values locally and/or temporally, so that a last movement of a potential mobile surrounding-area feature is derived from movement data values, to determine which mobile surrounding-area feature has been erroneously recognized or detected as a static surrounding-area feature and therefore actually represents the potential mobile surrounding-area feature.

7. The device as recited in claim 6, wherein the first surrounding-area data values are acquired with the aid of a surround sensor system of the vehicle, and wherein the movement data values are acquired using a sensor system independent of the surround sensor system of the vehicle.

* * * * *